March 20, 1973 R. H. KELLER 3,721,542
FUNNEL ARM MOUNTED MOLD LUBRICATION APPARATUS
Filed July 15, 1971 2 Sheets-Sheet 1

INVENTOR.
ROBERT H. KELLER
BY
ATTORNEYS

United States Patent Office 3,721,542
Patented Mar. 20, 1973

3,721,542
FUNNEL ARM MOUNTED MOLD
LUBRICATION APPARATUS
Robert H. Keller, Toledo, Ohio, assignor to
Owens-Illinois, Inc., Toledo, Ohio
Filed July 15, 1971, Ser. No. 162,809
Int. Cl. C03b 39/00
U.S. Cl. 65—169                                   6 Claims

ABSTRACT OF THE DISCLOSURE

A retractable lubrication unit mounted on the funnel arm of a glass forming machine for introducing a lubricant into glass forming molds. A reciprocating lubrication apparatus is mounted on the funnel arm of a glass forming machine and is operated to position a lubricant spray device over the funnel and retract the device during the period between seating of the funnel on the parison mold and the delivery of a glass charge through the funnel. During the time the spray device is over the open funnel, a mist of lubricant is sprayed into the forming mold through the funnel to provide the important lubricious surface on the forming mold and funnel necessary for efficient machine operation.

BACKGROUND OF THE INVENTION (1) Field of the invention

This invention relates to apparatus for the lubrication of molds on glassware forming machines. More specifically, this invention relates to a retractable mold lubrication device for such machines. Most particularly, this invention relates to a straight-line motion retractable mold lubrication device mounted on the funnel arm of a glassware forming machine.

(2) Description of the prior art

The most commonly used machine in the manufacture of glass containers is the IS machine manufactured by the Emhart Corporation of Hartford, Conn. In the operation of this machine, pre-cut charges of molten glass are delivered to a pre-form or parison mold and subsequently transferred to a blow mold or final forming mold. One of the serious problems involved in the operation of this machine has been the difficulty in keeping the molds and associated equipment such as plungers and neck rings properly lubricated and relatively clean of contaminants. Failure of lubrication can cause the glass to stick to the molds resulting in the formation of defects well known to those versed in the art. In the past, lubricant has been applied by hand swabbing or various mechanical spray devices controlled by the operator of the machine. Hand swabbing requires application of the lubricant at a time when the machine cycle permits access to the parts to be lubricated. This time is in advance of the time in the cycle when lubrication is most needed and furthermore tends to be uncontrolled in the amount of lubricant actually applied. In addition, the procedure involved generates some degree of hazard for the operator, since the lubricant does frequently flash. The use of mechanical spray devices controlled by the operator eliminates much of the hazard, but still requires application at an inefficient time in the machine cycle in a relatively uncontrolled manner resulting in the operator usually using an excessive amount of lubricant.

Many attempts have been made to solve this problem in the prior art, leading to the issuance of patents such as 3,141,752 to Keller; 3,523,016 to Mottos; 1,756,493 to Peiler and 3,480,422 to Lichok. However, all of these patents, with the exception of Peiler, which is not directed to the IS machine problem, require extensive and expensive modification to the machine structure. In addition, the use of the Keller and Lichok inventions requires an inventory of multiple sets of new change parts, such as funnels and plungers. These requirements have made the initial installation and required job changes of any of the prior art lubrication devices, on a multitude of IS machines, a very expensive and time-consuming process. The present invention is a simplified, inexpensive "add-on" attachment for IS machines which also gives much better lubricant distribution than is possible by the use of any of the known prior art spray mechanisms.

SUMMARY OF THE INVENTION

This invention is directed to apparatus for spraying lubricant into the open, upper ends of parison molds, through the guide funnel positioned on the mold, by a retractable spray nozzle carried by the funnel support arm and transported with the funnel operating mechanism. The retractable spray nozzle is in the form of a pneumatically actuable piston motor having a hollow piston rod through which lubricant is fed to the nozzle in the proper timed sequence so as to complete its spray cycle and be retracted just prior to the loading of a charge of glass through the funnel into the mold with the spray system being designed to feed a predetermined amount of lubricant.

DESCRIPTION OF THE PREFERRED EMBODIMENT

Figure 1:
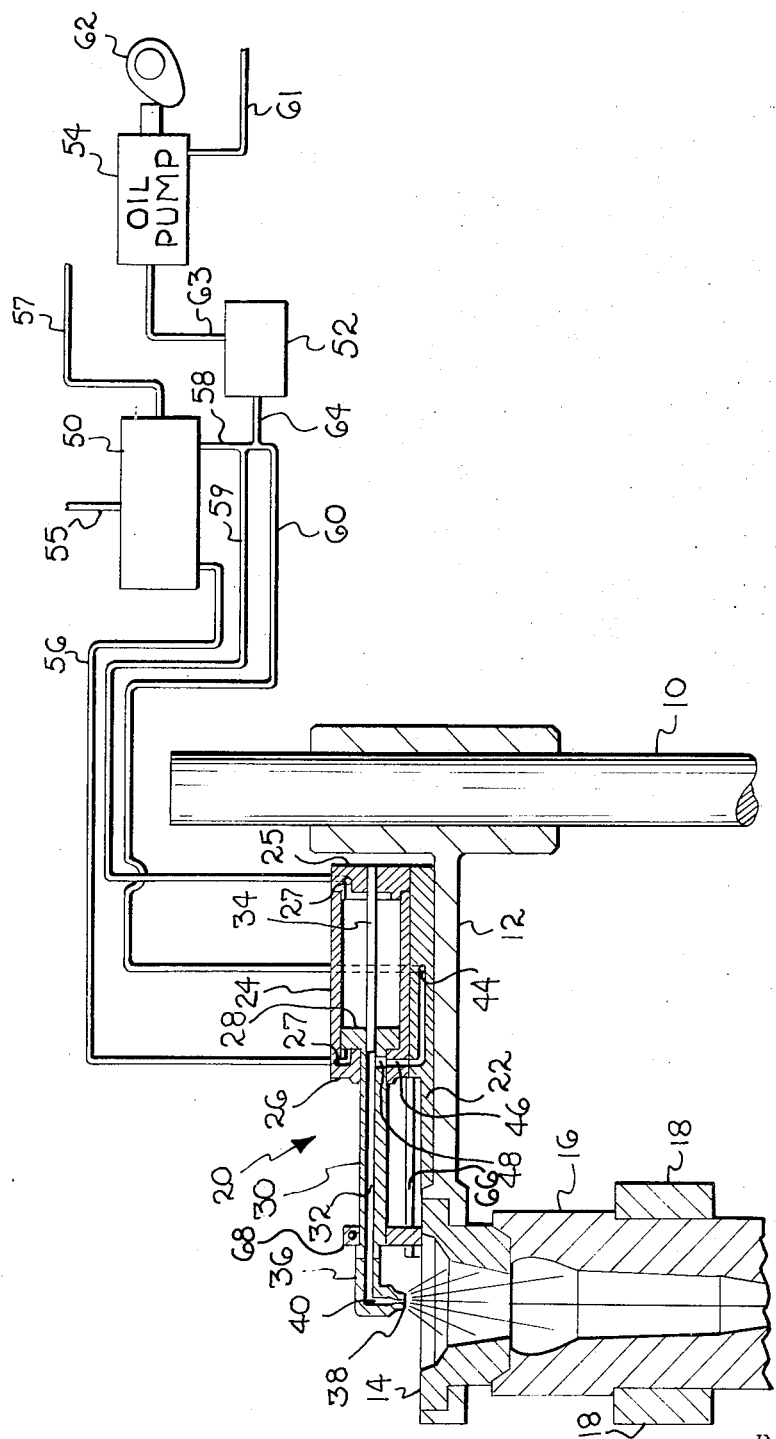
FIG. 1 is a sectional elevation view, in part schematic, showing the invention in operative position on the funnel arm of an IS glass forming machine and the associated control circuit therefor.
Figure 3:
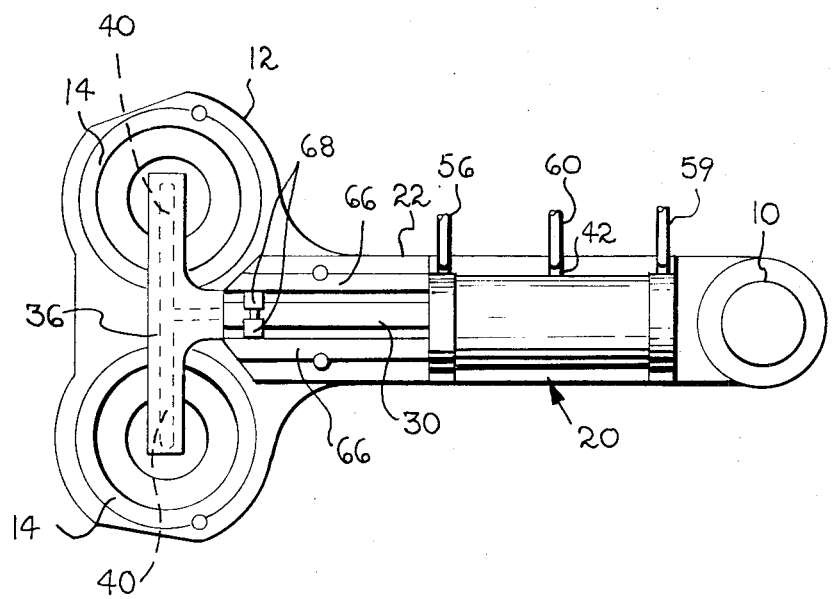
FIG. 3 is a top plan view of the apparatus of FIG. 1.

As shown in FIG. 1, a funnel operating shaft 10 has attached to it a funnel arm 12. The operating shaft 10 is axially reciprocated and rotated by the combination of an air motor and a helical cam (not shown) whose structure and function are known to those familiar with the IS machine. An example of such a machine is in U.S. Pat. No. 1,843,160 to Ingle. The funnel arm 12 carries a funnel 14. The funnel 14 is shown seated on the open, upper end of the closed, split parison mold 16, which is carried by a pair of mold arms 18. The funnel 14 is used to direct glass charges into the center and along the vertical axis of the forming mold 16. In FIG. 1, the mold 16 and and the funnel 14 are shown receiving lubrication from a lubrication unit generally designated 20. The lubrication unit 20 is formed with a base plate 22, which is attached to and moves with the funnel arm 12. Attached to the base plate 22 is an air motor having a body 24 and two end closing heads 25 and 26. The end closing heads 25 and 26 are provided with ports 27 to allow the introduction of air into either end of the body 24, thereby effecting the reciprocation of a piston 28, which is slideably mounted within the body 24. Attached to the piston 28 is a piston rod 30, extending through the end closing head 26, with the rod having a longitudinal passageway 32 extending throughout its length. The passageway 32 communicates with a central bore in the piston 28 at the point of attachment. The central bore in the piston 28 is normally blocked by a fixed valve rod 34. The valve rod 34 is attached to the end closing head 25 and extends axially throughout substantially the full length of the body 24. The valve rod 34 serves an important valving function which will be discussed in detail later. The piston rod 30 carries a lubrication distribution block 36 on its extending end. The lubrication distribution block 36, as best seen in FIG. 3, is generally T-shaped to allow the simultaneous lubrication of two glass molds 16. However, it is obvious that the lubrication block 36 may be of a different configuration to lubricate a single mold 16 or three or more molds 16 as required by any particular glass forming machine configuration. The lubrication distribution block 36 carries, at the extremities of each arm of the T, a downwardly directed spray nozzle 38 for spraying lubricant into the funnel 14 and the mold 16. Each nozzle 38 is fed lubricant from a lubricant flow channel 40 formed in the interior of the distribution block 36 and communicating with the passageway 32 in the piston rod 30. Lubricant, which is most commonly oil and graphite carried in an air stream, but which may be any material desired that can be forced through the various channels and passageways of the invention, is introduced to the lubrication unit 20 through a lubricant inlet pipe 42. The lubricant inlet pipe 42 is connected to a passage 44 formed in the base plate 22. The passage 44 opens upwardly through the base plate 22 in registry with a radial passage 46 formed in the end closing head 26. The passage 46 in turn, when the piston rod is extended, communicates with a transverse passageway 48 extending through the wall of hollow piston rod 30. Thus, when the piston rod 30 is extended over the mold 16 in the position shown in FIG. 1, there is a complete path for the flow of lubricant from the inlet 42 to the spray nozzles 38. It should be carefully noted that the lubricant passage 46 is completely independent from the air ports 27.

Figure 2:
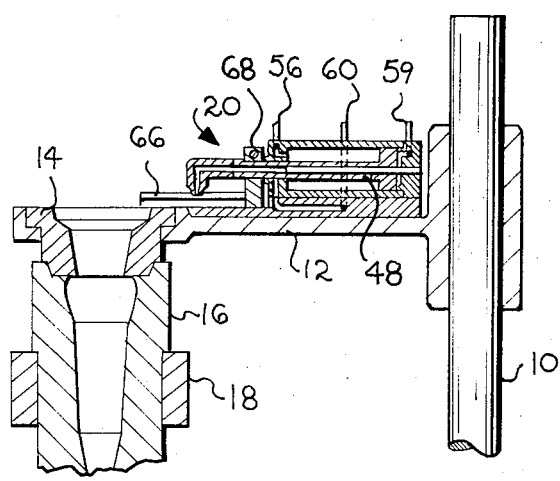
FIG. 2 is a sectional elevation view, similar to FIG. 1, showing the invention in its retracted position on the funnel arm.

Still with reference to FIG. 1, the control system for the lubrication unit 20 uses a four-way air valve 50, an oil injector 52 and a cam operated oil pump 54. The four-way valve 50 is of the commonly available commercial type, which uses a spring biased spool to divert the flow of air normally in one direction with a pilot air flow used to switch the flow of air. The spring biased position of the spool in the valve 50 is such as to keep the piston rod 30 normally retracted. That is, air, which is introduced into the valve 50 through a conduit 55 from a main air supply (not shown) is normally connected to pipe 56. This air in conduit 56 is introduced into the air motor body 24 through the inlet air port 27 in the end closing head 26 to retract the piston 28 to the position shown in FIG. 2. When the funnel 14 is seated on the glass mold 16 and it is desired to lubricate the funnel 14 and mold 16, pilot air is used to shift the main flow from the valve 50. The pilot air is introduced through a pilot air line 57, the pilot air itself being controlled, in this preferred embodiment, by a timing button on the IS machine timing drum. Under these conditions, the main air flow is diverted from the conduit 56 to a conduit 58. The conduit 58 splits into two branch conduits 59 and 60. The conduit 59 is connected to the head 25. Air from the conduit 59 enters the air motor body 24 via the port 27 behind the piston 28 (as shown in FIG. 2) and forces the piston 28 and the piston rod 30 to the position shown in FIG. 1. The other branch 60 of the conduit 58 is used to carry the lubricant to the lubrication unit 20. Lubricant (most typically oil) is supplied from a source (not shown) through an inlet pipe 61 to the oil pump 54. In a typical system, there will be only one oil pump 54 per IS machine, although each of the individual sections will have its own lubrication unit 20, four-way valve 50, and oil injector 52. The oil pump 54 is operated by a cam 62, which is driven in time with the machine cycle to provide lubricant under pressure to each oil injector 52 once per machine revolution. The oil injector 52, which is a standard type manufactured by the Lincoln Lubrication Corporation of St. Louis, Mo., is fed through a pipe 63 from the pump 54. The injector 52 passes a preselected amount of lubricant into an outlet line 64 during each pressure cycle of the pump 54. The timing of this lubricant injection and the operation of the lubrication unit 20 are not interrelated; the lubricant injected into the line 64 stays in position there until air, flowing down the branch conduit 60 of conduit 58, inspirates the lubricant waiting in the output line 64 and the resulting air-oil combination is fed to the lubricant inlet 42. This action occurs almost simultaneously with the switching of the air flow from the conduit 56 to the conduit 58, but lubricant cannot be sprayed from the spray nozzles 38 until the piston rod 30 has moved far enough to allow the transverse passageway 48 to come into alignment with the passage 46 in the end closing head 26. The valve rod 34 also serves the important function of preventing the escape of air through the transverse passageway 48 and the longitudinal passageway 32 and thence out the nozzles 38 during the movement of the piston 28 from the position shown in FIG. 1 to that shown in FIG. 2. As air enters the port 27 in the head 26 (assuming the piston 28 to be in the position shown in FIG. 1), the piston 28 and piston rod 30 will begin to move toward the head 25. The initial movement will disconnect the transverse passageway 48 and the passage 46, thus cutting off the flow of lubricant to the nozzle 38. If, however, the valve rod 34 did not seal the transverse passageway 48, which it does do shortly after the movement begins, the retraction air could enter the transverse passageway 48 and consequently the longitudinal passageway 32 with the result being the loss of pressure in the retraction side of pison 28.

To maintain proper operation, it is necessary that the alignment of the transverse passageway 48 and the passage 46 be constant when the piston rod 30 is extended. This requires that the piston rod 30 should not rotate. As best shown in FIG. 3, provision is made to prevent such rotation. Horizontal, elongated parallel guide rails 66 are attached to the base plate 22 with the path of the piston rod 30 being between the rails 66. The rails 66 control and guide anti-rotation blocks 68, which are clamped to the piston rod 30 and trapped under the guide rails 66. The combination of the rails 66 and the anti-rotation blocks 68 provide a means to prevent rotation of the piston rod 30.

In the practice of the present invention, the base plate is attached to and moves with the IS machine operating arm which carries the charge-loading funnels. Attached to the plate is the air motor whose extending piston rod carries a lubricant distribution block. In the case of a "double gob" or twin mold operation, as shown in the drawings, the distribution block is T-shaped having a spray nozzle at the extremities of the T cross arm. It should be noted, however, that the arm may be readily modified to serve a single mold or three or more aligned molds associated with the same funnel arm. The piston rod has a longitudinal passageway which connects with a branched channel in the distribution block to which the nozzles are attached. The normal cycle operation of the apparatus of the invention is such that after the funnel has seated on the open topped glass mold and before delivery of the glass charge, the piston rod is extended to position the spray nozzles over the molds. The extension of the piston rod causes the passageway in the rod to be aligned with the drilled opening in the head of the air motor, thus allowing lubricant to pass into the distribution block and out the spray nozzles, thereby lubricating the molds at the optimum point in the machine cycle. The piston rod is then quickly retracted to allow passage of the glass charge through the funnel into the mold. To ensure that the alignment between the head opening and the piston rod passageway remains constant, the piston rod is guided by rails to prevent it from rotating. The piston rod is extended and retracted by the movement of the piston to which it is attached. The piston is free to move within the air motor in response to the application of high pressure air on alternate sides of the piston. The piston has a central bore which connects with the longitudinal passageway in the piston rod. The fixed valve rod extends into the piston bore and is free to slide within this bore and the longitudinal passageway in the piston rod. When the piston begins to retract the piston rod, the passageway in the piston rod which had been in communication with the opening in the head comes into communication with the space behind the piston containing the air which is moving the piston. As the piston moves, the fixed valve rod covers this opening in the piston rod passageway. If this function were not performed, the retracting air would blow back through the piston rod passageway, the distribution block and the nozzles, thus creating an undesirable spray of air and perhaps some oil over the mechanisms in the path of retraction.

By positioning the spray nozzles directly over the center of the funnel and mold, a spray pattern may be utilized which will give all of the interior portions of the funnel and mold a relatively uniform coating of lubricant. The single spray source eliminates the problem of interference of multiple sprays with one another which occurs when multiple opposed spray orifices are used.

I claim:

1. Apparatus for spraying lubricant into open topped glass forming molds located on a glass forming machine of the type wherein at least one glass guiding funnel is carried by a funnel supporting arm comprising, a base plate attached to the funnel supporting arm of the glass forming machine, an air motor attached to said base plate, a slidably mounted piston contained within said air motor, an extensible piston rod attached to said piston with the path of motion of said piston rod being toward a funnel carried by said funnel arm, said piston rod being formed with a longitudinal passageway and a transverse passageway communicating with said longitudinal passageway and the exterior surface of said piston rod, a lubricant distribution block, having a lubricant flow channel extending therethrough, carried at the extending end of said piston rod, said lubricant flow channel communicating with said longitudinal passageway in said piston rod, at least one spray nozzle carried by said distribution block and communicating with said lubricant flow channel, end closing heads for said air motor, passage means formed in one of said heads communicating with said transverse passageway in said piston rod when said piston rod is in fully extended position with said spray nozzle centrally over said glass mold, means for selectively feeding air to opposite ends of said motor to extend and retract said piston rod, and means for feeding lubricant and air under pressure into said passage means in said one end closing head.

2. The apparatus of claim 1 further including means mounted on said base plate and piston rod for guiding said piston rod and preventing said piston rod from rotating during retraction and extension.

3. The apparatus of claim 2 wherein said means to guide said piston rod comprises rails attached to said base plate and anti-rotation blocks attached to said piston rod, said anti-rotation blocks being constrained to sliding motion by said rails.

4. The apparatus of claim 1 further including means positioned within said motor and piston rod for preventing air used to retract said piston rod from escaping through said piston rod transverse passageway.

5. The apparatus of claim 4 wherein said means to prevent air used to retract said piston rod from escaping comprises, a fixed valve rod extending into a central bore formed in the piston of said motor and into said longitudinal passageway in said piston rod, said valve rod adapted to slide within said piston rod longitudinal passageway to seal said transverse passageway, whereby the air used to retract said piston rod is prevented from escaping from said spray nozzle by the sealing engagement of said valve rod with said transverse passageway.

6. The apparatus of claim 1 wherein said lubricant distribution block is substantially T-shaped, said lubricant flow channel therein being substantially T-shaped, at least one spray nozzle being carried on each extending arm of said lubricant distribution block, said nozzles communicating with said lubricant flow channel, whereby at least two glass forming molds may be simultaneously subjected to a lubricating spray.

References Cited

UNITED STATES PATENTS

| 3,623,856 | 11/1971 | Keller | 65—170 |
| 3,141,752 | 7/1964 | Keller | 65—169 |
| 1,756,493 | 4/1930 | Peiler | 65—26 |
| 3,580,711 | 5/1971 | Hamilton | 65—169 |

FRANK W. MIGA, Primary Examiner

U.S. Cl. X.R.

65—14, 26, 181, 170, 262